United States Patent [19]

Nasr et al.

[11] Patent Number: 4,924,180

[45] Date of Patent: May 8, 1990

[54] APPARATUS FOR DETECTING BEARING SHAFT WEAR UTILIZING ROTATABLE MAGNET MEANS

[75] Inventors: Ali M. Nasr, Summit; Gregory W. Miller, Bridgewater, both of N.J.

[73] Assignee: Liquiflo Equipment Company, Warren, N.J.

[21] Appl. No.: 135,072

[22] Filed: Dec. 18, 1987

[51] Int. Cl.⁵ .............. G01B 7/14; G01M 13/04; G01P 3/44; F04B 21/00

[52] U.S. Cl. .............. 324/207.15; 73/66; 73/660; 324/207.25; 340/682; 417/63; 417/420

[58] Field of Search ............... 324/160, 163, 167, 174, 324/207, 208, 158 MG; 340/682, 683, 686, 870.31, 870.33; 73/660, 661, 66, 455, 462; 417/63, 420; 310/155, 168

[56] References Cited

U.S. PATENT DOCUMENTS

| | | | |
|---|---|---|---|
| 2,805,677 | 9/1957 | Baird | 324/207 X |
| 3,193,784 | 7/1965 | Lautzenhiser | 324/207 X |
| 3,194,990 | 7/1965 | Kendall | 324/208 X |
| 3,381,216 | 4/1968 | Sibley, Jr. et al. | 324/207 |
| 3,981,621 | 9/1976 | Considine | 324/167 X |
| 4,199,718 | 4/1980 | Ikeda et al. | 324/207 X |
| 4,665,361 | 5/1987 | Dorsch et al. | 324/207 |
| 4,732,494 | 3/1988 | Guers et al. | 324/208 X |

Primary Examiner—Gerard R. Strecker
Attorney, Agent, or Firm—Paul J. Cook

[57] ABSTRACT

A device is provided for measuring bearing or shaft wear in an apparatus utilizing a rotating shaft positioned in a bearing. A plurality of magnets are mounted on the rotating shaft and at least three coils forming at least two pairs of coils are mounted on a stationary housing surrounding the shaft. Means are provided for measuring the change in induced voltage for each pair of coils independent of shaft rotation speed, ambient temperature, the flux density of the magnets and the concentricity of the bearing and shaft diameters.

7 Claims, 5 Drawing Sheets

APPARATUS FOR DETECTING BEARING SHAFT WEAR UTILIZING ROTATABLE MAGNET MEANS

BACKGROUND OF THE INVENTION

This invention relates to an apparatus for detecting wear in a shaft or a bearing for a shaft in devices which utilize a rotating shaft positioned within a bearing. In one aspect of this invention, means are provided for detecting bearing or shaft wear in a sealed rotor pump.

A wide variety of devices utilize a rotating shaft positioned in a bearing such as motors, pumps or the like. In many instances, it is difficult to determine whether the bearing or shaft has worn to a degree where it must be taken out of service and replaced. Often times, continuing the use of a device having a worn bearing or shaft can lead to catastrophic results. For example, sealed rotor pumps often are utilized to pump corrosive and/or toxic liquids wherein the bearing and rotating shaft are immersed in the liquid. The shaft and bearing are out of view since they are sealed from the surrounding environment within the liquid. It is therefore difficult to determine whether undesirable wear has occurred A wide variety of devices have been proposed to provide a warning of bearing or shaft wear. These devices generally are positioned remotely from the shaft or bearing to a position where the indication of undesirable wear can be readily perceived such as audibly or visibly. In U.S. Pat. No. 3,678,493 a device is disclosed for measuring shaft radial position in a bearing. Two probes are positioned so that they sense the shaft surface and produce a high frequency electrical signal proportional to the shaft position and motions. The device requires a static measurement utilizing a DC signal to obtain the initial displacement of the shaft from a bearing center and a dynamic measurement with an AC signal to obtain total displacement as the sum of initial displacement and shaft lip. The requirement of both an AC and DC signal requires a relatively complex means for signal processing. Accordingly, it would be desirable to provide a means which affords simple signal processing in order to determine bearing or shaft wear.

U.S. Pat. No. 3,981,621 discloses a bearing wear detection device which utilizes a single large coil surrounding a containment vessel for a rotating shaft. The coil is positioned coaxially with the rotating shaft which shaft has magnets mounted thereon. When the shaft is rotated, the magnets will not induce a voltage in the coil as long as the shaft remains at the center of the coil. When the shaft axis of rotation moves from the center, a voltage is induced in the coil. In this device, the placement of the coil is critical since any misalignment of the center of the coil and the axis of rotation will cause an induced voltage in the coil. In addition, the device does not have a capability of indicating the direction of bearing wear so that one cannot determine whether the wear is even about the axis of rotation or uneven. Thus, one cannot determine whether the bearing wear is trivial or whether the rotating shaft and bearing require replacement.

U.S. Pat. No. 3,373,300 discloses a means for detecting bearing or shaft wear by an electric alternate current generated by utilizing two coils positioned on a stator 180° from each other. A voltage is induced in the coils when a rotor having rotor windings mounted thereon is rotated. The position of the shaft between the two stator winding then is determined by determining the difference in voltage induced in the two stator coils. The position of the stator coils must be precise since the device relies upon a predetermined air gap between the coils on the stator and the windings on the rotor. Furthermore, since only two stator coils are used, if there is a shift in shaft position which is equidistant from both stator coils, this shift will not be observed. Furthermore, since the induced voltage in the coils is dependent upon RPM of the shafts, the patented device must be operated at a constant RPM in order to render the induced voltages measured relevant to a shift in shaft position.

Additional examples of bearing wear detectors include U.S. Pat. Nos. 3,853,087; 3,614,731; 4,107,603; 4,199,718; 4,238,789; 4,423,635 and 4,584,865.

It would be desirable to provide a means for measuring bearing or shaft wear which is independent of shaft rotation, direction of shaft rotation, strength of magnets utilized in the detection device and independent of the size of a gap between the magnets and a sensor means.

SUMMARY OF THE INVENTION

In accordance with this invention, an apparatus is provided for detecting wear in a rotating shaft positioned in a bearing. A plurality of magnets mounted on the circumference of the rotating shaft and at least three coils comprising at least two pairs of coils are positioned equidistant from each other on a stationary housing surrounding the rotating shafts. The coils are positioned to detect magnetic flux density of the magnets on the shaft when the shaft rotates. A pair of detection means are provided to measure a change in position of the rotating shaft by detecting the difference in the voltage in the coils comprising a pair of coils. Means are provided to compensate for the effect of shaft speed and obtain a signal due only to wear. The measured signal is compared to a reference voltage which is proportional to shaft speed. Means are provided to assure that the wear voltage signal then exceeds the reference voltage signal for a given RPM.

DESCRIPTION OF SPECIFIC EMBODIMENTS

Figure 2:
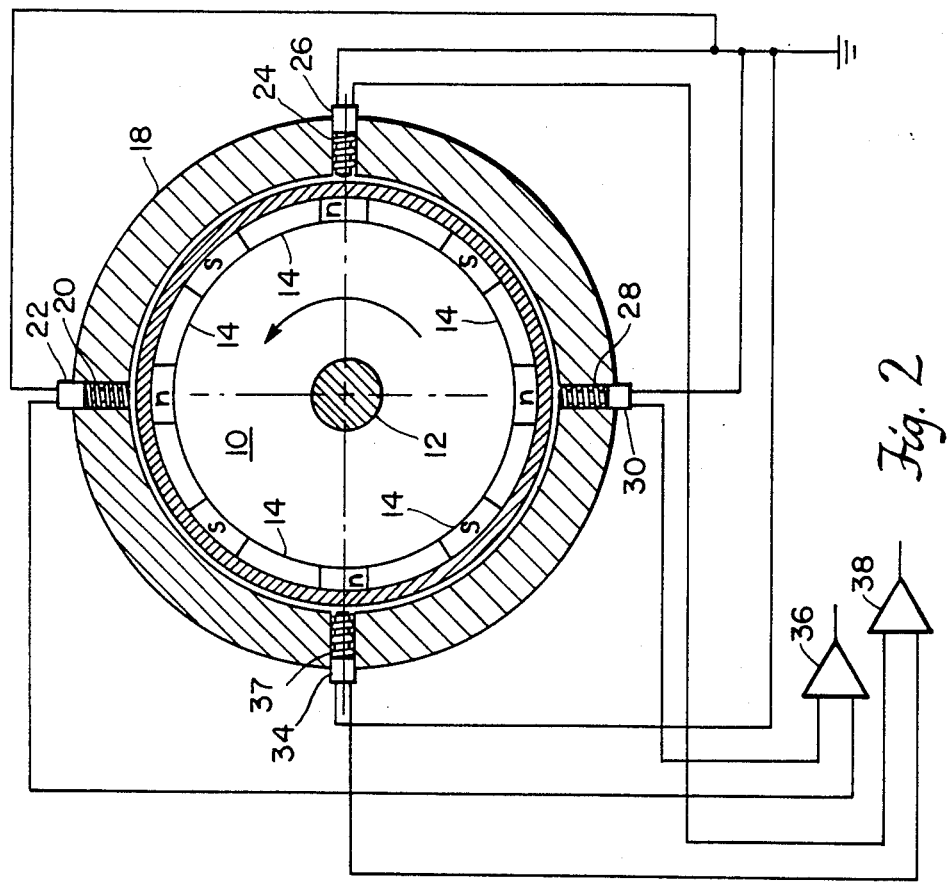
FIG. 2 is a cross-sectional view taken along line 2—2 of FIG. 1.

The present invention provides an apparatus for detecting wear in a bearing or shaft. In addition, the present invention can be utilized to measure shaft rotation speed and, in the case of a sealed pump, detect a no-flow condition therethrough when pump shaft rotation has ceased. The apparatus of this invention comprises non-contacting, magnetically actuated multi-inductive sensors having circuitry designed to measure voltage differentials across opposing stationary sensors positioned about a rotating shaft having magnets thereon. Means are provided to relate changes in the voltage differentials to the location of a rotating shaft in a bearing and thereby correlate any shift in location of the shaft to either shaft or bearing wear. The device includes at least three coils comprising inductive pick-ups fixedly positioned and equally spaced about a rotating shaft. The three or more coils comprise at least two pairs of coils wherein voltage differential between the two coils within a given pair can be measured. When only two coils are utilized, it is possible that a shaft could move in a direction so that it remains equidistant between the two coils and a voltage differential would not be effected. Thus, with only two coils, bearing or shaft wear may not be detected. It is preferred to utilize two pairs of coils formed from four coils which are positioned 90° from each other whereby a pair of coils comprise the two coils which are 180° from each other. Additional pair of coils can be utilized. However, each additional pair would require additional circuitry. The rotating shaft has attached thereto at least one magnet in order that a voltage is induced in the stationary coils while the shaft is rotating. The amount of induced voltage is dependent upon the speed that the magnetic flux field is passing the inductive coil and the gap between the coil and the magnets. In accordance with this invention, the apparatus is designed so that the measured voltage at the coils is independent of the speed of rotation (RPM) of the shaft. To compensate for the effect of shaft speed and obtain a signal due only to bearing or shaft wear, the voltage differential obtained for a given pair of coils is compared to a reference voltage which is proportional to shaft speed. The wear voltage signal then must exceed the reference signal for the RPM of the shaft in order to be indicative of bearing or shaft wear. The apparatus of this invention is insensitive to the accuracy of the concentric locations of the coils and the variability of magnetic flux density of commonly available magnets. This insensitivity is due to the fact that the apparatus of this invention utilizes difference in voltage between opposing coils in a given pair of coils and does not utilize absolute amounts of voltage. The apparatus of this invention can be adjusted to establish a reference location of the shaft which is indicative of a zero measurement and the effects of coil location and magnetic strength variability therefore can be offset.

As the shaft rotates in use, the shaft or the bearing or both will begin wearing and the rotating shaft will shift position. This shift in position creates a voltage change in the stationary coils which then is used to identify how far from the reference location the shaft has moved. Thus, the apparatus of this invention not only senses wear in the bearing or shaft, it provides an accurate measurement of the degree of wear regardless of the specific location of the wear point. Thus, the apparatus of this invention provides a voltage differential measurement which can be correlated accurately to the degree of wear such as in millimeter or inch scales or to a light system such as a green-amber-red light system to signify the degree to which the bearing or shaft wear has become a problem.

Figure 1:
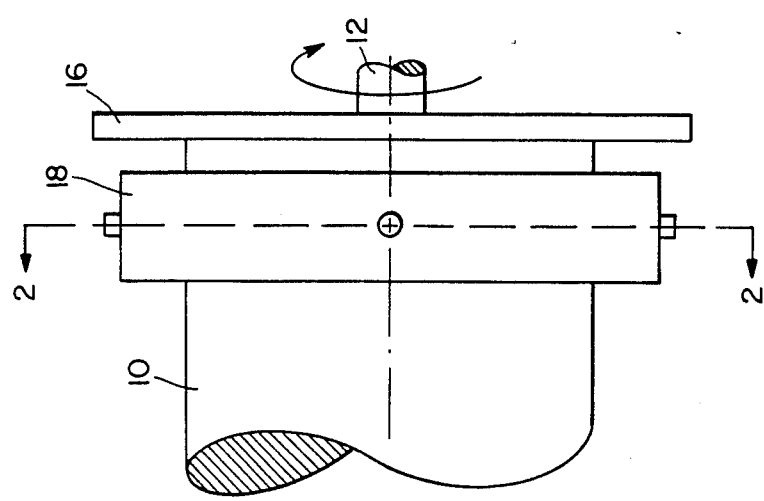
FIG. 1 is a side view of the bearing wear detector of this invention.

Referring to FIGS. 1 and 2, the apparatus of this invention comprises a rotating shaft 10 to which is attached a driven shaft 12 which in turn can be attached to any device which incorporates a driven shaft (not shown). A plurality of magnets 14 are fixedly secured to the shaft 10 about the shaft periphery. The shaft 10 is mounted in bearing 16. Positioned about shaft 10 is a stationary collar 18 having four openings 90° from each other within which are placed a coil 22 positioned about ferromagnetic cylinder 20, a coil 24 positioned about ferromagnetic cylinder 26, a coil 28 positioned about ferromagnetic cylinder 30 and a coil 32 positioned about ferromagnetic cylinder 34. Coils 22 and 28 are connected to differential amplifier 36 and coils 24 and 32 are connected to differential amplifier 38.

Figure 3:
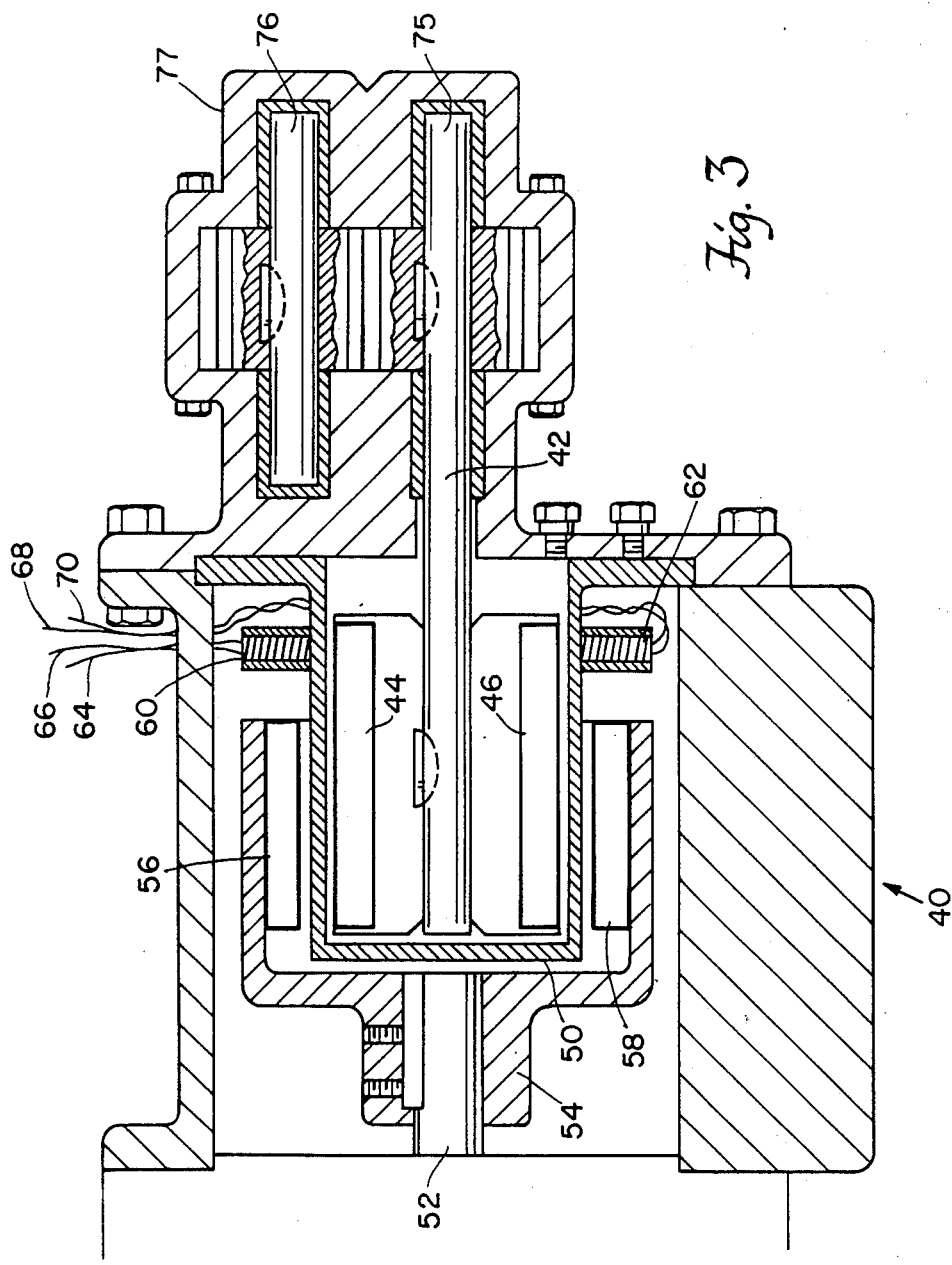
FIG. 3 is a cross-sectional view of a sealed rotor pump utilizing the apparatus of this invention.
Figure 4:
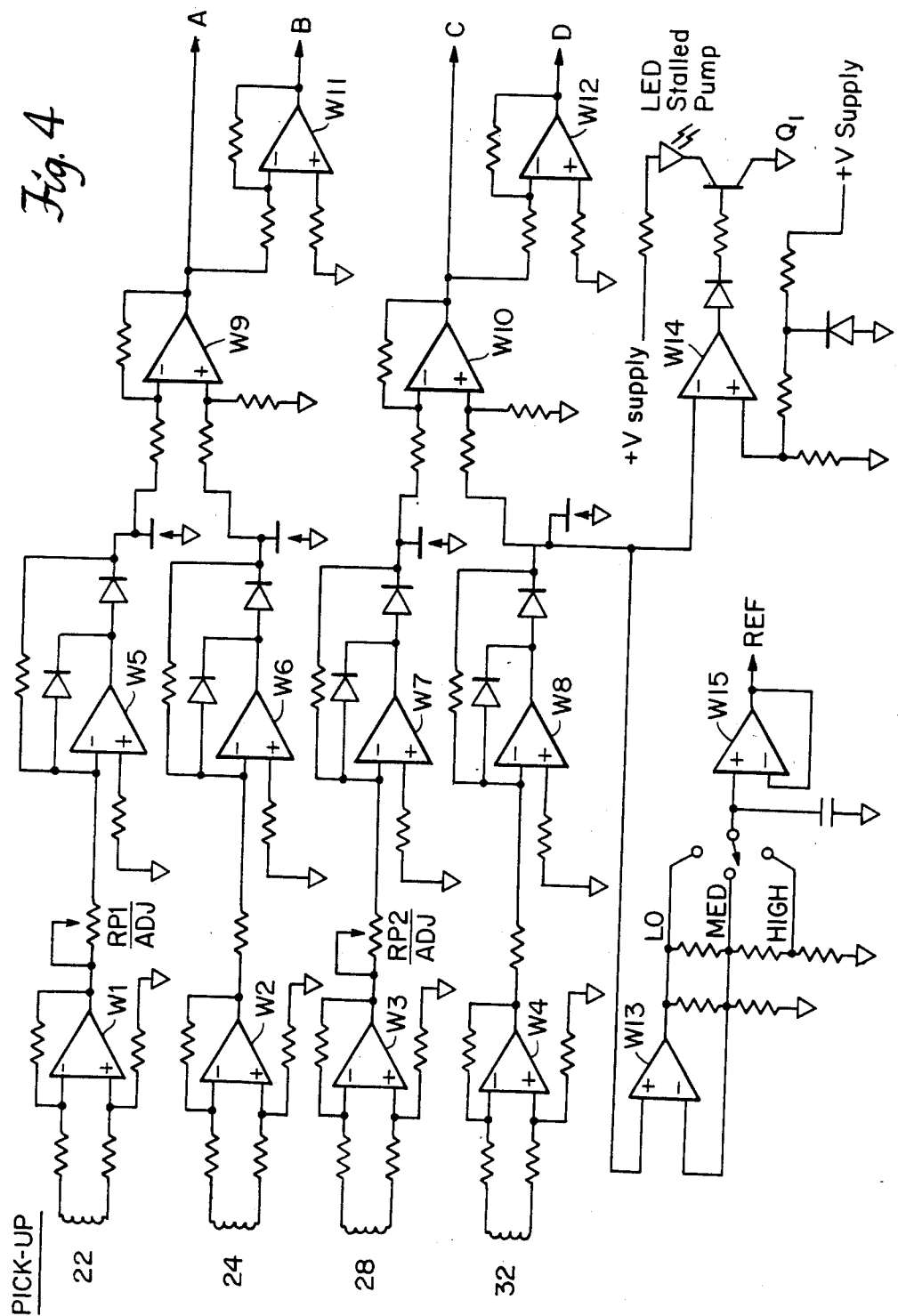
FIG. 4 is a circuit diagram illustrating the generation of electrical voltage from coils positioned on a stationary portion of the device of this invention.
Figure 5:
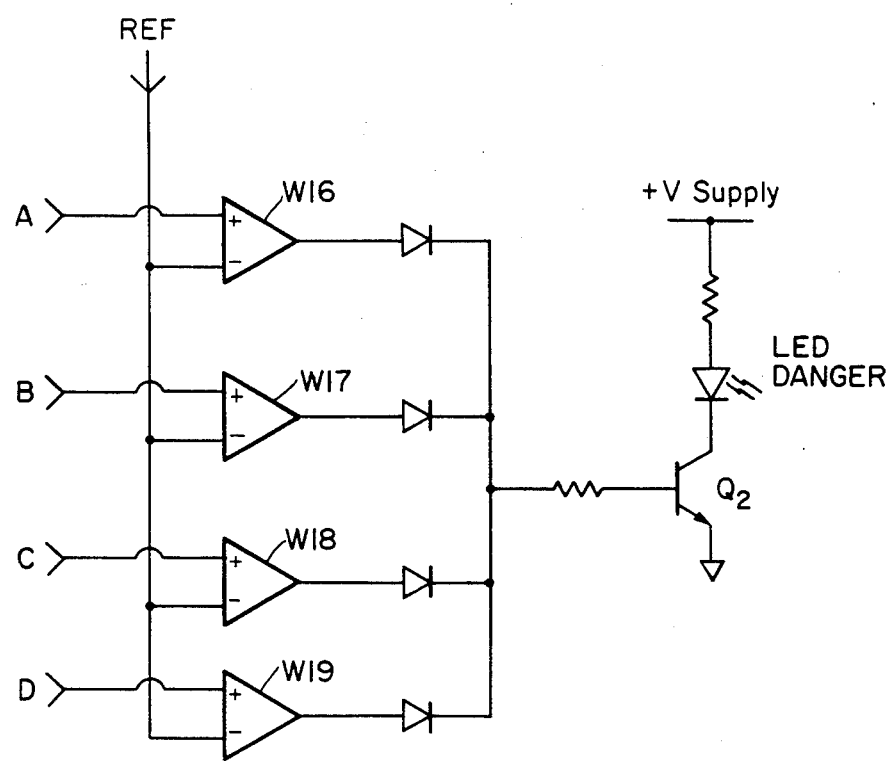
FIG. 5 is a circuit diagram showing the use of the signals generated from the coil portions of this invention.

Referring to FIG. 3 a sealed pump 40 comprises a rotatable shaft 42 to which is attached four magnets, including 44 and 46. The shaft 42 is positioned within fixed housing 50. A drive shaft 52 is connected to rotatable housing 54 to which are attached magnets 56 and 58. Inductor coils 60 and 62 are mounted on fixed housing 50 and are connected to lead wires 64, 66, 68 and 70 which are connected to indicator means (not shown) outside of the pump 40. The magnets 44 and 46 and the flux of these magnets 44 and 46 interact with the coils 60 and 62. When the rotatable housing 54 is rotated, the flux fields of magnets 56 and 58 interact with the flux fields of magnets 44, and 46 and thereby cause rotatable shaft 42 to rotate. Rotatable shaft 42 rotates gear 75 which meshes with gear 76 in order to effect pumping of the liquid within pump 40. The two gears 75 and 76 rotate within housing 77. The meshed portion of gears 75 and 76 form a block to liquid path while the non-meshing portions of gears 75 and 76 carry liquid about their perimeter, 76 in order to effect pumping of the liquid within pump 40. This structure is referred to in the art as a spur on external gear pump. It is to be understood that this invention can be utilized with any rotatable pump such as a centrifugal pump, or a sliding vane pump or the like. Referring to FIGS. 4 and 5 coil pick-ups 22 and 24 are 180° apart as are coil pick-ups 28 and 32. Amplifiers W1, W2, W3 and W4 are configured as differential amplifiers to reduce common mode interference. Amplifiers W5, W6, W7 and W8 are configured as ideal-diodes, amplifiers W11 and W12 invert the polarities of W9 and W10 thereby giving two pairs of signals; A-B and C-D, each signal pair will contain a positive voltage proportional to the difference in voltages between respective coil pick-ups. The difference between coil pick-ups 22 and 24 will appear as a positive signal at either A or B. The difference between coils pick-ups 28 and 32 will appear as a positive signal at either C or D. Voltages induced in the coil pick-ups are a function of the distance between the coil pick-ups and the rotating magnets. When the shaft is concentric the voltages are equal. As the shaft becomes eccentric, the coil pick-ups closer to the shaft will generate a larger voltage. When the shaft is concentric, the signals at A, B, C and D are normally zero. As the shaft increases its eccentricity, the voltages at A, B, C and D increase. Amplifiers W16, W17, W18 and W19 are configured as comparators, which compare A, B, C and D to a reference voltage which is proportional the speed of rotation of the shaft. The reference is proportional to the speed of the shaft since the voltages of A, B, C and D are proportional to the speed of the shaft as well as proportional to eccentricity. When the signal at either A, B, C or D exceeds the reference, transistor Q2 activates an LED or light emitting diode or other equivalent indicator to indicate danger. The reference voltage is derived from a coil pick-up and is buffered by W13 to a switch which allows the user to select how much eccentricity is required to activate the light emitted diode. Amplifier W14 is a comparator used to detect a stalled pump condition. Trimpots RP1 and RP2 are used to compensate for initial differences in voltages from coil pick-ups.

Adjustments (ADJ) may be made to zero-out any voltages exjant at start up.

We claim:

1. In an apparatus comprising a rotating shaft mounted in a bearing and a stationary housing surrounding said rotating shaft, the improvement comprising a means for detecting wear in said bearing or said shaft including a plurality of magnets mounted about the circumference of said shaft and at least two pairs of coils mounted on said stationary housing surrounding said shaft, the coils being positioned substantially equidistant from each other, each coil being positioned to detect magnetic flux density of said magnets when said shaft rotates, and means for detecting a change in axial position of said rotating shaft independently of speed of shaft rotation by detecting a change in voltage induced in each pair of coils, said means for detecting a change of shaft position independent of shaft rotation speed comprising means for generating a D.C. voltage from each of said coils, means for generating a reference D.C. signal voltage as a function of speed of shaft rotation and means for subtracting said reference D.C. signal voltage from the D.C. voltage generated from each of said pairs of coils.

2. The apparatus of claim 1 having two pairs of coils comprising four coils.

3. The apparatus of claim 1 having two pairs of coils comprising three coils.

4. In a sealed pump comprising a rotatable shaft mounted in a bearing, a stationary sealed housing surrounding said rotating shaft, a plurality of inner magnets mounted on said rotatable shaft, a motor driven shell surrounding said housing and a plurality of outer magnets mounted on said shell, the improvement comprising means for detecting wear in said bearing or said shaft including at least two pairs of coils mounted on said stationary housing surrounding said shaft, the coils being positioned to detect magnetic flux density of said inner magnets when said shaft independently of speed of shaft rotation rotates and means for detecting a change in axial position of said rotating shaft by detecting a change in voltage induced in each pair of coils, said means for detecting a change of shaft position independent of shaft rotation speed comprising means for generating a D.C. voltage from each of said coils, means for generating a reference D.C. signal voltage as a function of speed of shaft rotation and means for subtracting said reference D.C. signal voltage from the D.C. voltage generated from each of said pairs of coils.

5. The pump of claim 4 having two pairs of coils comprising four coils.

6. The pumps of claim 4 having two pairs of coils comprising three coils.

7. The pump of claim 4, 5 or or 6 including means for substantially isolating the magnetic flux of said outer magnets from said coils.

* * * * *